United States Patent
Pritchard et al.

(10) Patent No.: US 6,857,035 B1
(45) Date of Patent: Feb. 15, 2005

(54) METHODS AND APPARATUS FOR BUS MASTERING AND ARBITRATION

(75) Inventors: Jeffrey Orion Pritchard, Santa Cruz, CA (US); Tim Allen, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 364 days.

(21) Appl. No.: 10/227,504

(22) Filed: Aug. 23, 2002

Related U.S. Application Data
(60) Provisional application No. 60/322,300, filed on Sep. 13, 2001.

(51) Int. Cl.[7] .................. G06F 13/00; G06F 13/14; G06F 13/38; G06F 12/00
(52) U.S. Cl. .................. 710/110; 710/107; 700/3
(58) Field of Search .................. 710/110, 113, 710/107, 305, 241, 22, 200; 327/19; 711/100; 700/3; 709/208; 718/107; 712/32, 36; 370/916

(56) References Cited

U.S. PATENT DOCUMENTS

| | | | | |
|---|---|---|---|---|
| 6,393,506 B1 | * | 5/2002 | Kenny | 710/113 |
| 6,681,283 B1 | * | 1/2004 | Thekkath et al. | 710/305 |
| 6,701,398 B1 | * | 3/2004 | Wyland | 710/107 |
| 6,772,254 B2 | * | 8/2004 | Hofmann et al. | 710/110 |

OTHER PUBLICATIONS

"A multistage hierarchical distributed arbitration technique for priority–based real–time communication systems" by Cena, G.; Valenzano, A. (abstract only) Publication Date: Dec. 2002.*
"Architecture and bus–arbitration schemes for MPEG–2 video decoder" by Jui–Hua Li; Nam Ling (abstract only) Publication Date: Aug. 1999.*
ARM, "Multi–Layer AHB: Overview," ARM DVI 0045A, ARM Limited, © 2001, pps. 1–12.
ARM, "AMBA Specification (rev. 2.0)," ARM IHI 0011A, ARM Limited, © 1999, pps. ii–5–38.

* cited by examiner

*Primary Examiner*—Gopal C. Ray
(74) *Attorney, Agent, or Firm*—Beyer, Weaver & Thomas, LLP.

(57) ABSTRACT

Methods and apparatus are provided for providing a first master component with access to a first slave component while a second master component is accessing a second slave component in a system. The system may include a processor core and peripherals implemented on an integrated circuit. A slave side arbitrator corresponding to a single slave component and coupled to multiple master components can be used to provide a master component access to a slave component.

36 Claims, 10 Drawing Sheets

Figure 10

METHODS AND APPARATUS FOR BUS MASTERING AND ARBITRATION

CROSS-REFERENCE TO RELATED APPLICATIONS

This application claims priority under U.S.C. 119(e) from U.S. Provisional Application No. 60/322,300 entitled "Methods And Apparatus For Bus Mastering And Arbitration," as of filing on Sep. 13, 2001, the disclosure of which is herein incorporated by reference for all purposes.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present application relates to mastering and arbitration. More specifically, the present application relates to methods and apparatus for allowing multiple master components in a system to access multiple slave components simultaneously.

2. Description of Related Art

Conventional systems using a shared bus architecture have several drawbacks. In typical systems with a bus architecture, a single arbitrator controls communication between multiple master components and multiple slave components. To access a slave component, a master component requests control of the bus from the single system bus arbitrator. If no other master component is using the bus at a given moment, the system bus arbitrator can grant the request and provide control of the bus to the master component. The master can then send information to the target slave. However, if another master component is using the bus, the master component would have to wait for access from the system bus arbitrator as only one master component can use the bus at any given time. That is, a first master component wishing to access a first slave component would have to wait until a second master component finished accessing a second slave component because of the requirement that only one master can use the bus at a time. The rule applies even if the first master and the first slave components are idle.

It is therefore desirable to provide improved methods and apparatus for master components to access slave components in a system.

SUMMARY OF THE INVENTION

Methods and apparatus are provided for providing a first master component with access to a first slave component while a second master component is accessing a second slave component in a system. The system may include a processor core and peripherals implemented on an integrated circuit. A slave side arbitrator corresponding to a single slave component and coupled to multiple master components can be used to provide a master component access to a slave component.

According to various embodiments, a system having multiple master components and multiple slave components is provided. The system includes a first master component, a second master component, and a first slave side arbitrator associated with a first slave component. The first slave side arbitrator couples the first and second master components to the first slave component. The first slave side arbitrator is operable to determine that the first master component has access to the first slave component and maintain the access if the slave component issues a split instruction.

According to other embodiments, a programmable chip having an embedded processor core is provided. The programmable chip includes a first master component, a second master component, wherein the second master component is a processor core, a slave side arbitrator coupling the first and second master components to a first slave component, and a second slave component coupled to the second master. The slave side arbitrator is associated with a master locking indicator providing the first master component access to the first slave component while the second master component has access to the second slave component.

In other embodiments, a method for arbitration in a system having multiple master components is provided. A first master is provided access to a first slave. The first master and the first slave are components of a processing system. A split instruction associated with the first slave is disregarded. A second master is provided with access to a second slave while the first master is accessing the first slave. The second master and the second slave share a single address space with the first master and the first slave in the processing system.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 10 is a diagrammatic representation showing a system builder tool that can be used to generate a slave side bus arbitration system.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
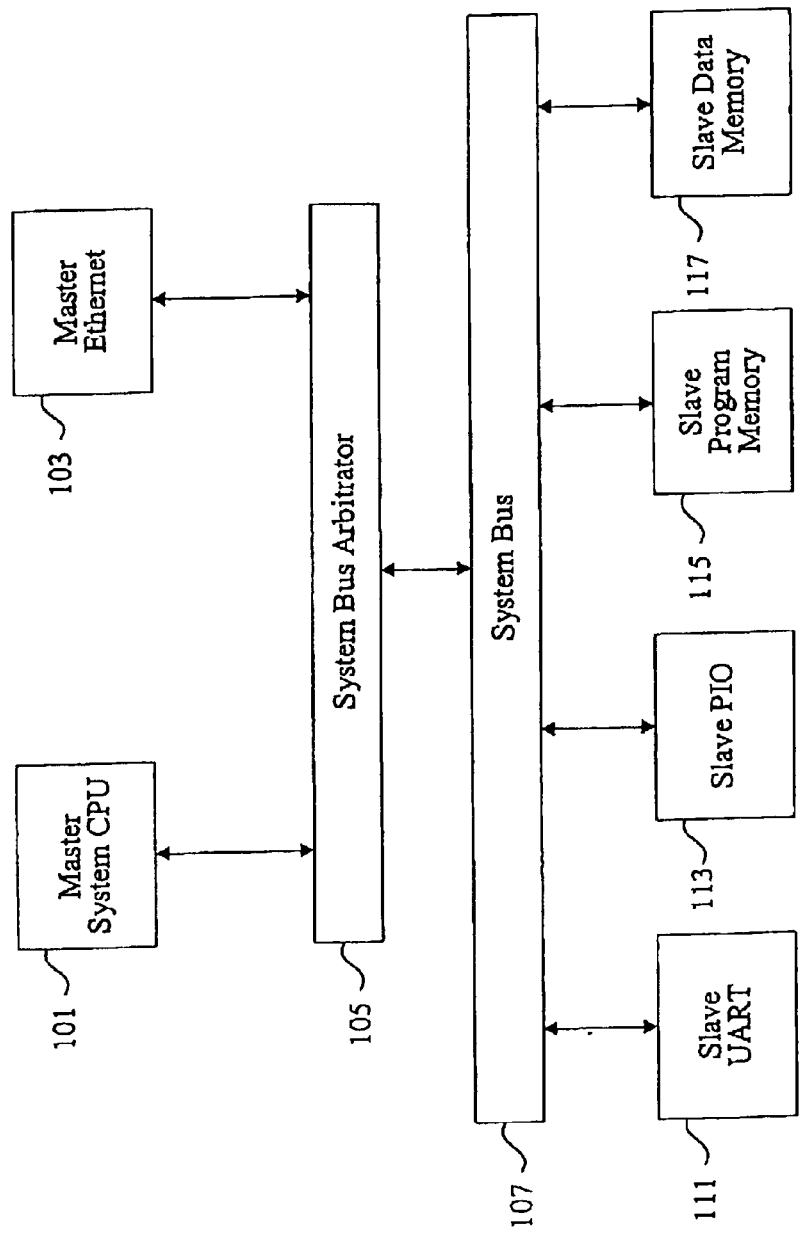
FIG. 1 is a diagrammatic representation showing a computer system with a system bus architecture.

FIG. 1 is a diagrammatic representation showing a computer system with a conventional system bus architecture. The computer system includes master components 101 and 103 as well as slave components 111, 113, 115, and 117. Any component or device that is operable to initiate read and write operations by providing control information is referred to herein as a master component. Control information can include a particular address associated with a slave component. Any component or device that responds to read or write operations with information sent back to be master regarding the read or write operation is referred to herein as a slave component. Some examples of master components are processors and Ethernet devices. Some examples of slave components are Universal Asynchronous Receiver Transmitters (UARTs), Parallel Input Output (PIO), program memory, and data memory. It should be noted that some components such as Ethernet component 103 can be both a master component and a slave component, as Ethernet component 103 has the capability of reading and writing to the slave program memory 115 while also responding to instructions from master system CPU 101.

The computer system also includes a system bus 107 that connects to various master components and the various slave components. A system bus 107 typically has a set width (e.g. 64 bits, 128 bits) and allows only one master component to actively use the bus at any one time. In conventional systems, only one master component can access any one of the given slave components and any given time. A master component performing a read or write operation on a slave component is referred to herein as accessing a slave component. Multiple master components accessing multiple master components in a manner that would cause data bit collisions if performed on the same data lines is referred to herein as accessing slave components at the same time. In one example, a master system CPU 101 is accessing a slave PIO 113. While the master system CPU 101 is accessing the slave PIO 113, the master Ethernet component 103 can not access another slave component such a slave program memory 115 even if both the master Ethernet component 103 and the slave program memory 115 are idle.

According to various embodiments, master components and slave components share a single address space. A system having components interacting using transactions such as reads, writes, loads, and stores is referred to herein as a system having a single address space. This contrasts with systems having components that communicate over interfaces using transactions such as sends and receives to explicitly communicate.

The system bus arbitrator 105 determines which master component has access to the system bus 107 at any time. The system bus arbitrator 105 can determine which master can access a slave based on criteria such as fairness or priority.

Any component or device that is configured to ensure that only one master can access any one of the slave components at any given time is referred to herein as a system bus arbitrator. Various schemes such as weighted fairness can be implemented to improve the efficiency of slave component access, but such schemes can increase system complexity and latency. In conventional implementations, a computer system includes a single system bus arbitrator for each bus in the computer system.

Even with various fairness and priority schemes implemented in a system bus arbitrator 105, the system bus 107 remains a significant bottleneck in any computer system, particularly in computer systems with high-performance components that exceed the performance of the system bus. In computer systems with high-performance components, many master and slave components perform various functions internal to the component quickly but end up waiting for bus access.

Figure 2:
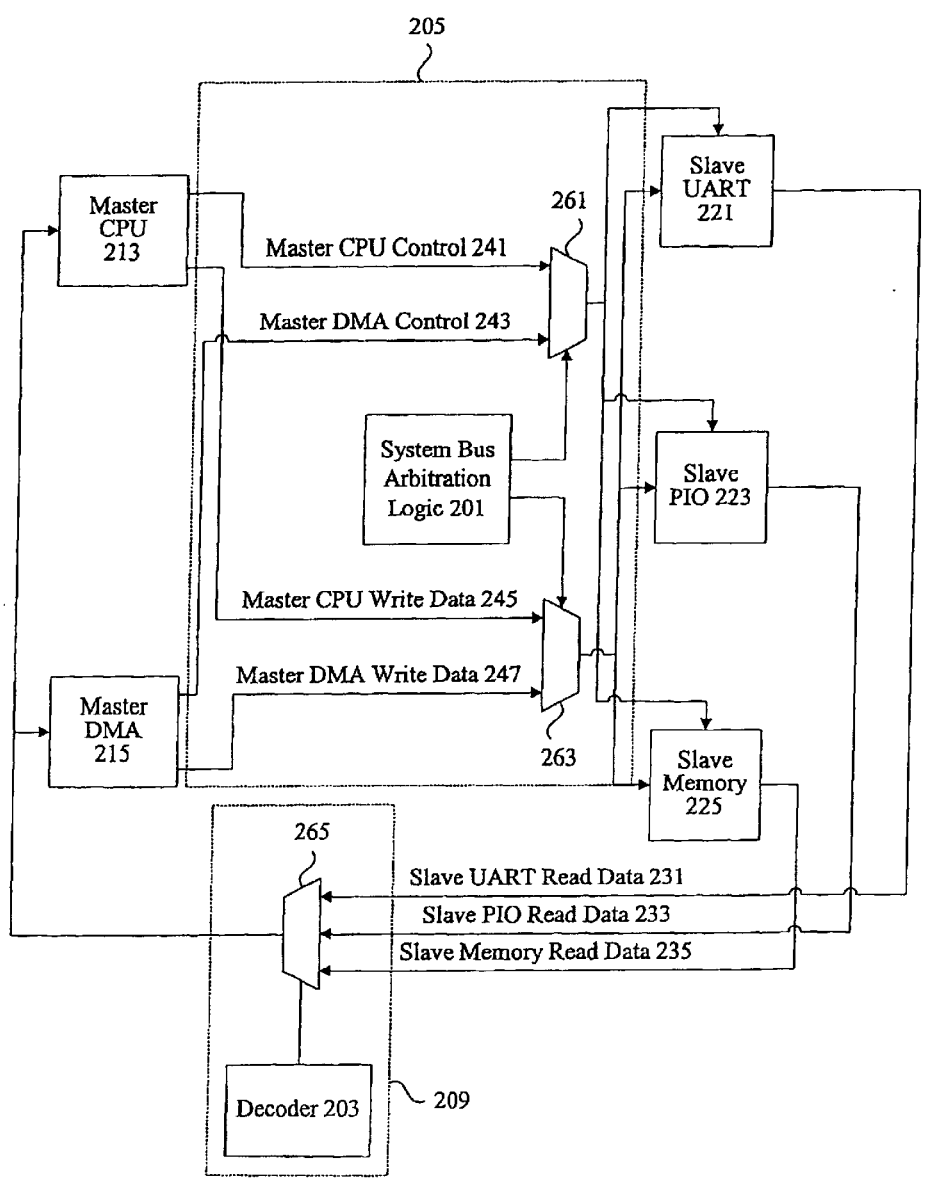
FIG. 2 is a diagrammatic representation depicting a system bus arbitrator.

FIG. 2 is a diagrammatic representation depicting one example of a conventional system bus arbitrator. A system bus arbitrator 205 includes arbitrator switching circuitry 261 and 263 as well as system bus arbitration logic 201. Logic and mechanisms for selecting an input based on a control signal are referred to herein as arbitrator switching circuitry. It should be noted that although switching circuitry generally can be implemented using multiplexers, a variety of mechanisms including switches and transistors can be used.

Logic and mechanisms for providing the control signal based on criteria such as fairness or priority are referred to herein as arbitration logic. The inputs of the arbitrator switching circuitry 261 and 263 is connected to master CPU 213 and master DMA 215. The outputs of the arbitrator switching circuitry 261 and 263 are connected to slave UART 221, slave PIO 223, and slave memory 225. The outputs of the slave components transmit information such as read data back to the master components through a decoder 209. Mechanisms for selecting slave components and translating control information such as addresses is referred to herein as a decoder. In conventional computer systems, there is a single decoder for each bus. A decoder 209 includes decoder logic 203 and decoder switching circuitry 265 for selecting the particular slave component data transfer. A decoder can also be referred to as a master side arbitrator including master side arbitration logic and master side switching circuitry.

Logic and mechanisms for selecting an input based on a control signal in a decoder are referred to herein as decoder switching circuitry. Logic and mechanisms for providing the decoder control signal based on selection of the appropriate slave device are referred to herein as decoder logic. The decoder 209 selects the appropriate slave component read data to provide back to master CPU 213 and master DMA 215.

In conventional systems, before transfer of data can occur between master components and slave components, a master component must be granted access to the bus. The access grants are typically initiated with the master sending a request signal to the system bus arbitrator 205. The system bus arbitrator 205 then determines when the master will be granted use of the bus. When the master component is granted access to the bus, a master such as master CPU 213 sends control information 241 to the system bus arbitrator 205. Control information includes, for example, address information, transfer direction, and transfer width information. Typical data transfers include a clock cycle for control information and one or more cycles for data. A slave component responds to a master component by indicating that the transfer is progressing normally, the transfer is complete, or a transfer error has occurred. A slave component can also indicate to the master component that the transfer should be retried.

Because a single master component accessing a slave component prevents other master components from accessing other slave components, one slave component response is a "split" response. When a slave component recognizes that a request will take a long time to complete, the slave component can send a split response. In one example, a master component sends a request to a slave component to access data that the slave component can not immediately retrieve. If the slave component recognizes that the data will take some time to acquire, the slave component can send a split signal to the master component. It should be noted that a retry signal can also be sent. A signal such as a split signal instructs the master component to release access to the slave component. By releasing access to the slave component, another master component such as master DMA 215 can access the various slave components on the bus. Nonetheless, only one master can access the various slave components at any given time.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip. Instead of implementing complicated bus sharing schemes using mechanisms such as splitting, the bus itself can be eliminated to improve system performance. According to specific embodiments, it is recognized that master components and slave components need not be routed through a construct such as a bus. The conventional data and address lines that make up the bus are no longer the resource in contention. Instead, slave components are resources in contention, as the number of physical lines connected to each slave component in a system can be fixed.

Consequently, a system bus arbitrator associated with all the slave components in a computer system is no longer needed. Instead, slave components themselves that may be accessed by more than one master component are assigned individual slave side arbitrators. An arbitrator that corresponds to a specific slave component accessible by more than one master component is referred to herein as a slave side arbitrator. In one embodiment, there is a slave side arbitrator for each slave component in a computer system. In other embodiments, there is a slave side arbitrator for selected slave components in a system.

Figure 3:
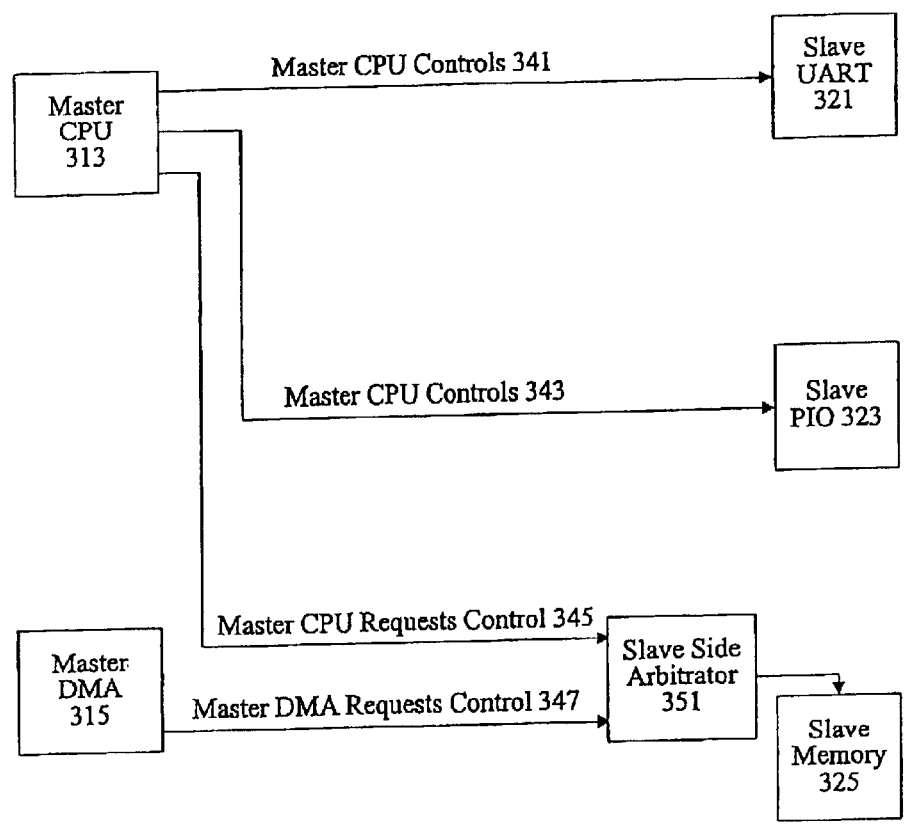
FIG. 3 is a diagrammatic representation showing an arbitrator associated with a slave component.

FIG. 3 is a diagrammatic representation showing one example of a system using slave side arbitration. A system using individual arbitrators that correspond to individual slave components accessible by more than one master component is referred to herein as a slave side arbitration system. The slave side arbitration system no longer requires a bus or a system bus arbitrator that prevents a second master component from accessing a second slave component when a first master component is accessing a first slave component. According to various embodiments a slave component such as slave memory 325 is associated with a slave side arbitrator 351. However, slave components UART 321 and PIO 323 are not associated with any arbitrator. In one example, slave component UART 321 and slave PIO 323 can only be accessed by master CPU 313 and not by master DMA 315. A slave memory component 325, however, can be accessed by both master CPU 313 and master DMA 315. According to various embodiments, a slave side arbitrator 351 allows a first slave component in a system to be accessed by a first master component at the same time a second slave component in the system is accessed by a second master component. For example, slave memory 325 can be accessed by master DMA 315 through slave side arbitrator 351 at the same time, slave UART 321 is accessed by master CPU 313.

A slave side arbitrator 351 can be configured to prevent master CPU 313 from accessing slave memory 325 while master Ethernet 315 is accessing slave memory 325. The slave side arbitrator 351, however, does not prevent master CPU 313 from accessing other slave components 321 and 323. If instead a conventional system bus arbitrator was used, the system bus arbitrator would prevent a master CPU from accessing any slave component when a master DMA is accessing a slave memory component.

Figure 4:
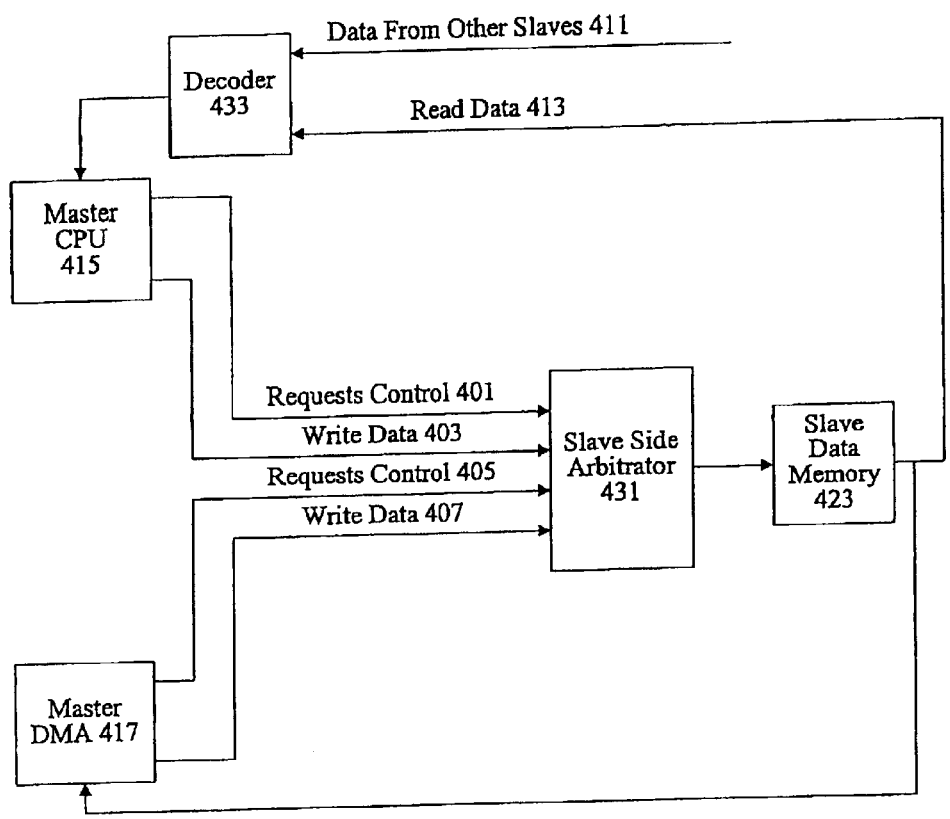
FIG. 4 is a diagrammatic representation showing an arbitrator associated with a master component.

FIG. 4 is a diagrammatic representation showing one example of a master component accessing a slave component through a slave side arbitrator. The master CPU 415 and master DMA 417 are coupled to slave data memory 423 through slave side arbitrator 431. A master CPU 415 can request control at 401 and write data at 403. A master DMA 417 can request control of a slave data memory component 423 using a request control message 405 and can send data to the slave data memory component 423 by writing data at 407. The slave data memory 423 can send information including read data 413 back to master components 415 and 417. The master CPU 415 is also associated with a decoder 433 that selects information from one of the slaves to provide to master CPU 415 at any given time. According to various embodiments, the slave side arbitrator 431 is a parameterizable part of a system. The bus arbitrator can be configured to provide control over system slaves, define valid data paths within the system, and implement priority and fairness schemes.

In one example, a master CPU 415 requests control of slave data memory 423 during a first clock cycle. If the slave side arbitrator 431 grants access to the master CPU 415, data can be exchanged between master CPU 415 and slave data memory 423 during subsequent clock cycles.

Figure 5:
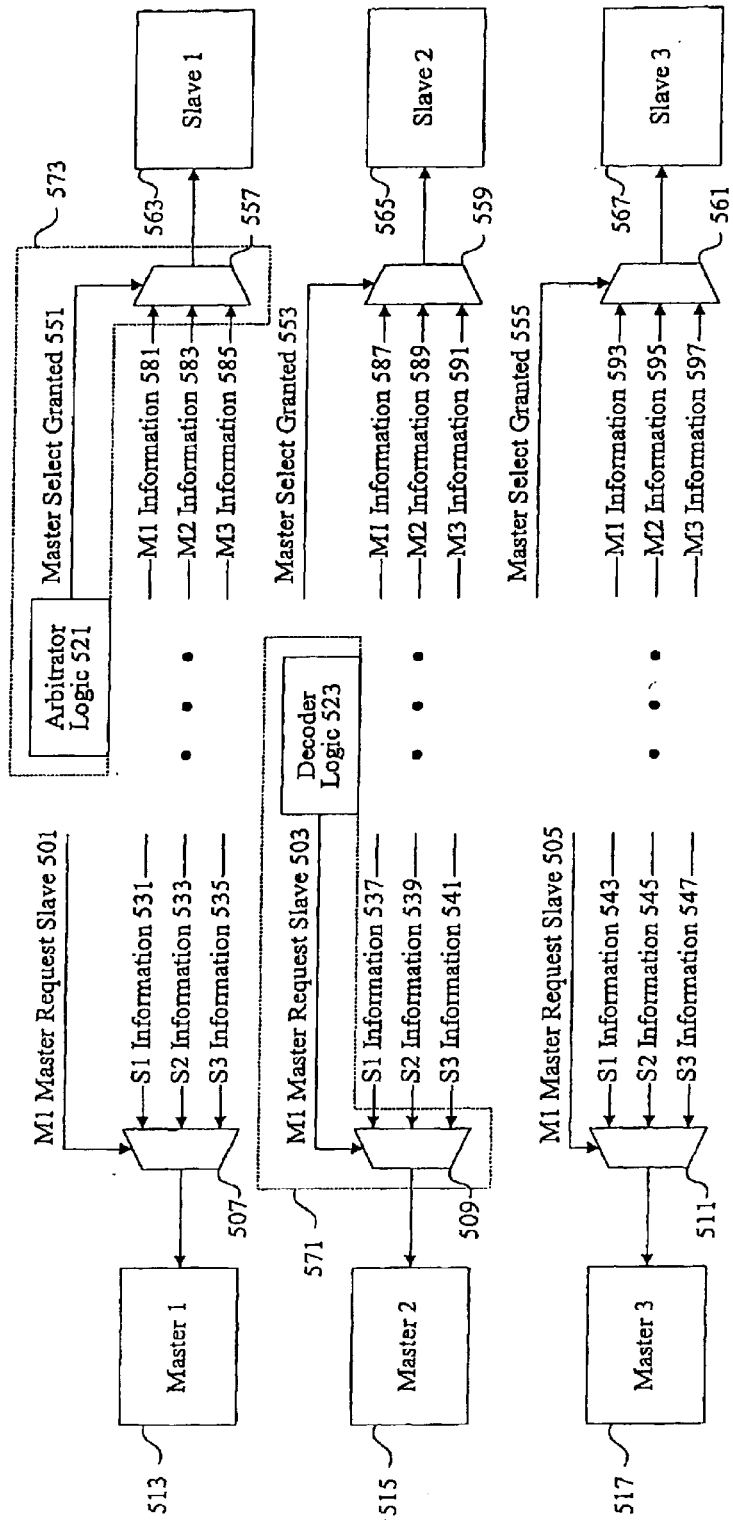
FIG. 5 is a diagrammatic representation depicting a system with slave side arbitrators, master components, and slave components.

FIG. 5 is a diagrammatic representation showing an example of a slave side arbitrator. According to various embodiments, a slave side arbitrator 573 includes arbitrator selection circuitry 557 and arbitrator logic 521. The arbitrator selection circuitry 557 selects whether to provide information 581 from master 513, information 583 from master 515, or information 585 from master 517 to provide to a slave component 563. In one specific example, selection circuitry 557 is a multiplexer receiving a control signal master select granted 551 from arbitration logic 521. Slave components 565 and 567 are also associated with individual arbitrators.

When slave components send information to master components, a decoder can be used to select the information from the appropriate slave. In one embodiment, a master component 515 is coupled to a decoder 571. The decoder 571 includes decoder selection circuitry 509 and decoder logic 523. Decoder selection circuitry selects information 531 from slave 563, information 539 from slave 565, or information 541 from slave 567 to provide to master component 515 based on a master request slave control signal 503 from decoder logic 523. According to one embodiment, each decoder includes decoder selection circuitry and decoder logic and each arbitrator includes arbitrator selection circuitry and arbitrator logic. However, all arbitrator logic and all decoder logic can be contained in a single arbitrator logic block. That is, all control signals sent to arbitrator selection circuitry and decoder selection circuitry associated with the various slave components and master components can be configured to originate from a single arbitrator logic block.

It should be noted that all the master component in FIG. 5 are shown to be connected to all the slave component. Each master component is also associated with a decoder while each slave component is associated with an arbitrator. However, it should be noted that not all master components need to be connected to all slave components and not all slave components need to be connected to all master components. Some master components may not need a decoder when a master is connected to only a single slave component. In the same manner, some slave components may not need an arbitrator when the slave component is only connected to a single master component.

Figure 6:
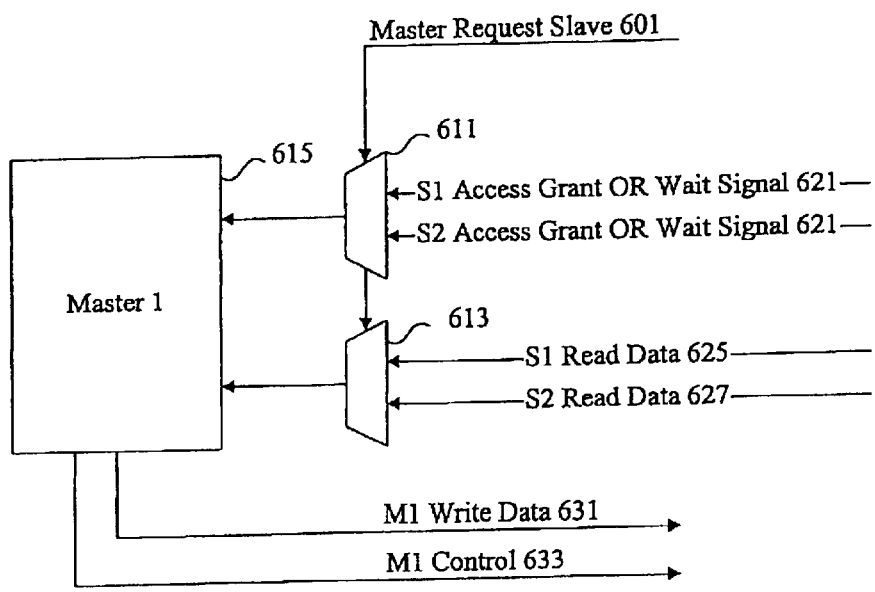
FIG. 6 is a diagrammatic representation showing switching circuitry associated with master components.
Figure 6:
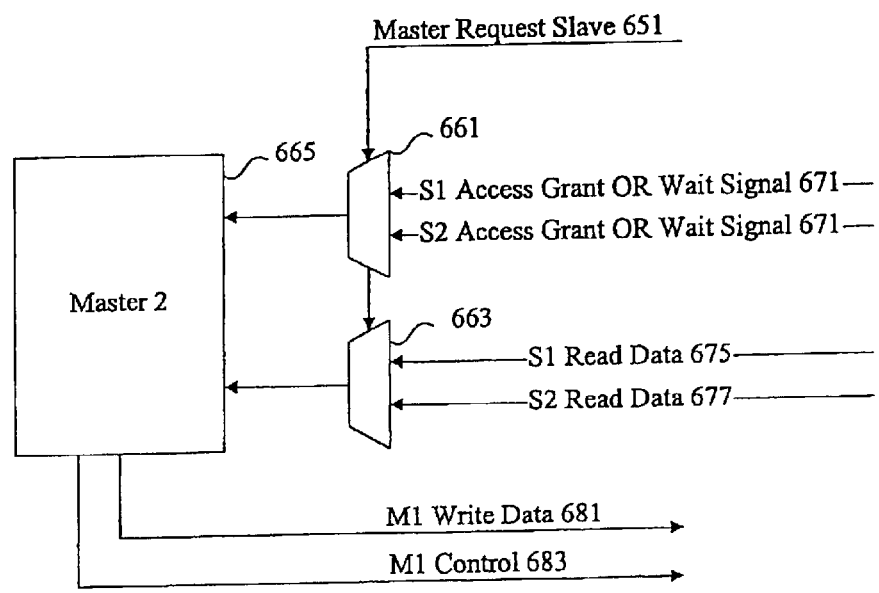

FIG. 6 is a diagrammatic representation showing master components and corresponding decoder selection circuitry that can be used in a slave side arbitration system. According to various embodiments, the master component 615 can send a request to access a first slave component. Selection circuitry 611 and 613 corresponding to master component 615 receive a master request slave control signal 601 from associated arbitration logic telling the master component 615 what slave to receive information from. Here, since master component requests access to a first slave component, the master request slave control signal 601 would instruct selection circuitry 611 and 613 to take the inputs from the first slave. The first slave may send back information 621 such as an access grant or a wait signal. According to various embodiments, if the first slave is not currently being accessed and the master component 615 is the only master component requesting access to the slave at a given time, access is automatically granted.

In another example, a master component 615 and a master component 665 may both be requesting access to a first slave component at the same time. The slave side arbitrator is allowed to receiving requests from multiple master components in the same period of time or the same clock cycles. If the slave side arbitrator associated with a first slave component receives access requests from master component 615 and master component 665 at the same time, the slave side arbitrator selects one of the master components based on schemes such as weighted round-robin or round-robin combined with priority, etc. In one instance, master component 615 is selected and selection circuitry associated with master component 615 receives an access grant from the first slave and subsequently read data 625 from the first slave.

According to various embodiments selection circuitry 661 and 663 associated with master component 665 gets a wait signal 671. In one example, the slave side arbitrator associated with the first slave component simply tells the master component 665 to wait. In another example, slave side arbitrator also saves away address and control information associated with master component 665. When the second master component 665 finally does get access to a slave sometime after master component 615 finishes accessing the slave component, the address and control information associated with master component 665 is used to implement the data transaction with the first slave component. The slave side arbitrator may also have to signal the second master component that the transaction is okay during the period that the slave side arbitrator keeps the master component 665 waiting. The slave side arbitrator may also receive additional access requests for the first slave component from other master components in the system. The slave side arbitrator can handle these additional requests using the same selection scheme and by issuing wait signals to the master components not granted access.

According to various embodiments, a system uses a first clock cycle for address information and subsequent clock cycles for data. All master to slave component signals can be connected directly during a first clock cycle in such a system. All slave to master component signals can be connected directly on a subsequent clock cycle.

It should be noted that a slave side arbitration system can be implemented with a variety of master components and slave components. In one example, a slave side arbitration system can be implemented with components that specifically support slave side arbitration. Various master components that support slave side arbitration would recognize that it could access a first slave component while a different master component was accessing a second slave component. However, the slave side arbitration system can also be implemented with components that expect a conventional system bus and a conventional system bus arbitrator. A slave side arbitration system can be configured to provide master components and slave components with signals expected in a conventional bus arbitration system.

In one example, a master component that is not selected expects to receive a wait signal from a conventional system bus arbitrator except when it issues an idle command to the system bus arbitrator. If the master component issues an idle command to the system bus arbitrator, the system bus arbitrator is expected to provide a ready signal to any master not selected that issues an idle command.

Figure 7:
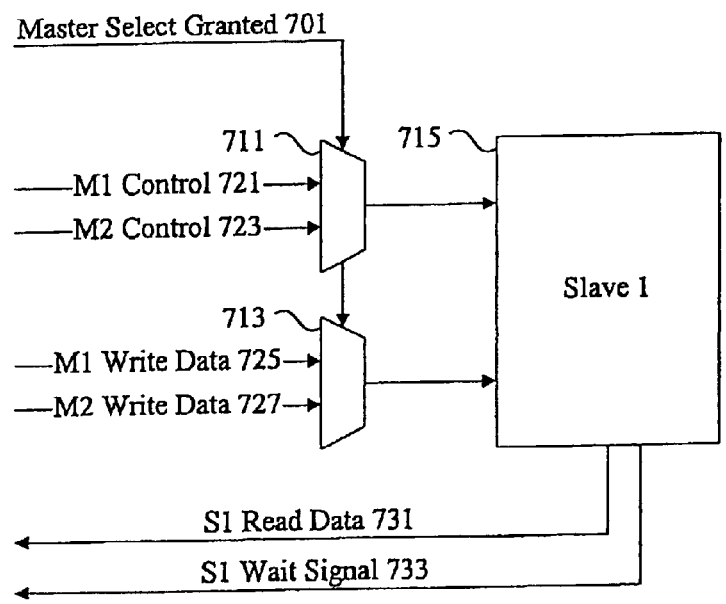
FIG. 7 is a diagrammatic representation showing switching circuitry associated with slave components.
Figure 7:
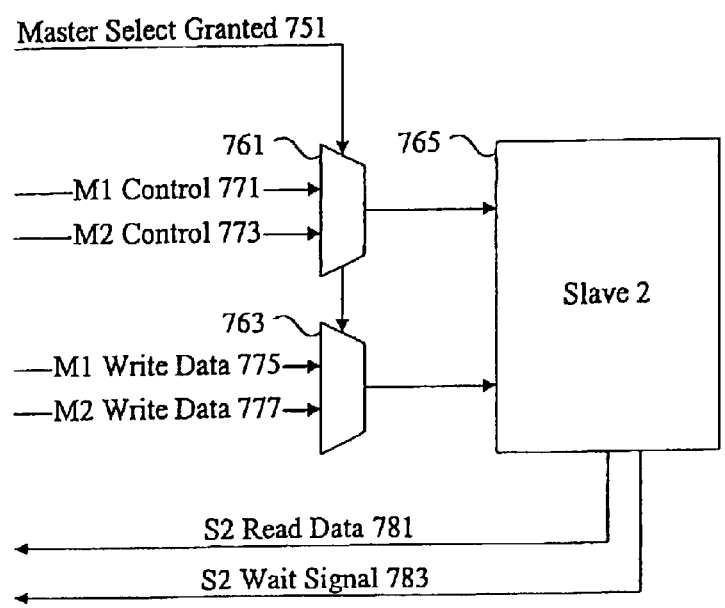

FIG. 7 is a diagrammatic representation showing selection circuitry associated with slave components, according to specific embodiments. A slave component 715 receives control information 721 and write data 725 from a first master or control information 723 and write data 727 from a second master based on a master select granted control signals 701 from the slave side arbitrator associated with slave component 715. According to specific embodiments, the slave component 715 can provide read data 731 as well as wait signals 733 back to the various master components.

As noted above, a slave side arbitration system can be implemented with a variety of master components and slave components, including master and slave components that expect to be used in a conventional system bus architecture. Such slave components may occasionally issue instructions such a split instructions during a transaction between the slave component and a first master component. As noted above, a first slave component may occasionally issue a spilt instruction to a first master component to allow a second master component to access a second slave component. Any information sent by a slave component to a master component to share a bus is referred to herein as a split instruction. Split instructions may be issued to allow other master components to use a conventional system bus. However, a slave side arbitration system does not require a conventional system bus and instructions such as split instructions are no longer necessary.

When a slave component issues instructions such as a split instructions, split instructions can be disregarded. Having a slave component issuing the instruction remain assigned to the master component during the split transaction is referred to herein as disregarding the split instruction. According to various embodiments, a slave side arbitrator includes a dedicated master locking indicator. Whenever the slave side arbitrator recognizes that the slave component has issued a split instruction, the indicator can be set to lock the particular master to the particular slave component. Any arbitrator information used to fix access between a master component to a particular slave component is referred to herein as a master locking indicator. In one example, the indicator can be cleared whenever the slave component says the current transaction is okay and it is ready for additional transactions.

Figure 8:
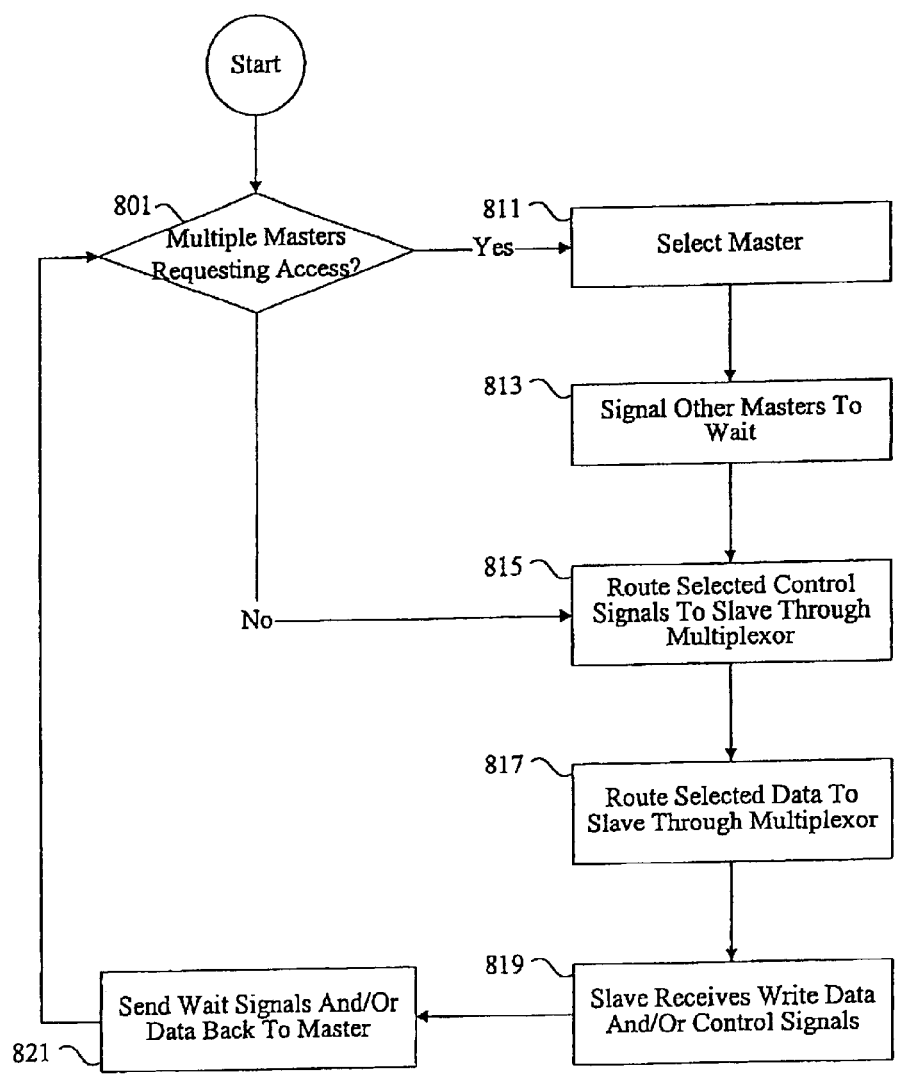
FIG. 8 is a flow process diagram showing slave side arbitration.

FIG. 8 is a process flow diagram showing the handling of multiple master component at a slave side arbitrator associated with a slave component such as a memory, UART, or PIO. As noted above, each slave component can be associated with a slave side arbitrator. By having multiple slave side arbitrators each associated with slave components, a master component can access a slave component while allowing other masters access to other slave components. Although multiple slave side arbitrators can be used, it should be noted that a single arbitration logic block can be used with multiple arbitration selection components such as multiplexers and transistors. In conventional systems, once a master component accesses a slave, all other masters components are unable to access any slave component. However, using slave side arbitration allows other masters to access other components while a first master is accessing a first component. Slave side arbitration can also be referred to as simultaneous multi-mastering.

According to various embodiments, it is determined at 801 whether there are multiple master components requesting access to a slave component such as a memory block. If it is determined at 811 that multiple masters are requesting access to the same peripheral, a master is selected using a selection scheme such as fairness, round robin, or priority as noted above. It should be noted that multiple masters requesting accessing at a given time (e.g. during a particular clock cycle) can include not only master components sending access requests at the given time, but can also include master components that sent access requests in the past (e.g. during prior clock cycles). According to various embodiments, the master components that sent access requests during a particular time period that were not selected using the selection scheme are sent wait instructions at 813. Master component that sent access requests during prior clock cycles may have already received wait instructions during prior clock cycles.

According to various embodiments, a slave component or a slave side arbitrator can instruct various master components to wait. At 815, the slave side arbitration logic sends a control signal to arbitration selection circuitry to select a particular input line associated with the selected master component. In one embodiment, the arbitration component may send a control signal to a multiplexer to allow the multiplexer to receive the input line associated with a processor core. Each input line may be connected to a particular master component. It should be noted that a variety of switching components can also be used in place of a multiplexer such as a 2-to-1 or 3-to-1 multiplexer.

If at 801 it is determined that there is only a single master requesting access to a particular slave component, the arbitration component can signal the multiplexer to immediately select the single master. According to various embodiments, only a single master component requesting access to a particular slave component means that no other master components are waiting for access. Control information such as address information is routed to the slave component through selection circuitry at 815. Data is routed to the slave component through selection circuitry at 817. According to various embodiments, the slave component receives write data and/or control information from the selected master component at 819.

In one example, a processor core may be attempting to write a data block to memory. In another example, a processor core may be attempting to send read requests for a particular address to the memory component. At 821, the slave component sends wait signals and/or data back to the master component. According to various embodiments, a read request from a processor core may take a number of clock cycles to process. A slave component can instruct a master to wait for a response to a memory read. According to other embodiments, a slave component may immediately send data back to the master component.

Figure 9:
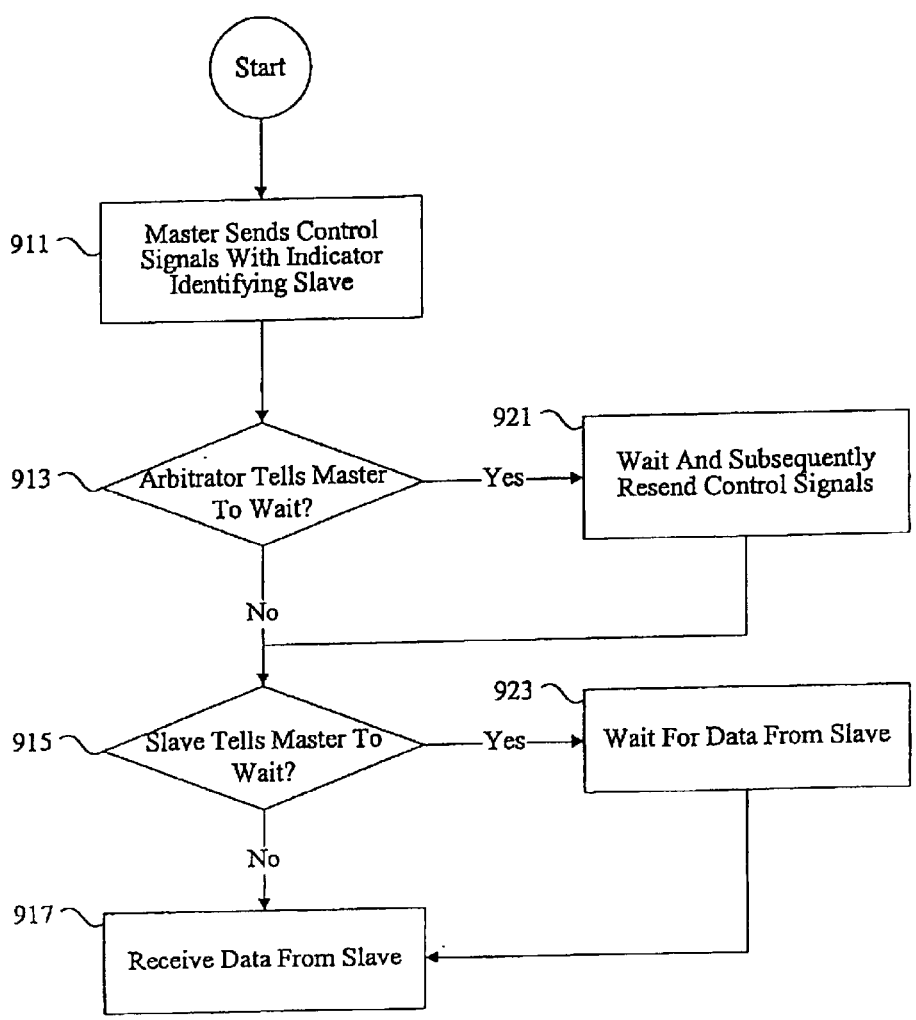
FIG. 9 is a flow process diagram showing master component interaction with an arbitrator.

FIG. 9 is a process flow diagram showing the interaction of a master component and arbitration logic. According to various embodiments, both a slave side arbitrator and an accessed slave component can tell a master component to wait. In one example, a slave side arbitrator tells a master component to wait when another master component has been granted access to the slave. A slave component may tell a master component to wait when the transaction requested by a master component will take a discernible amount of time to complete.

At 911, a master component sends data identifying a particular slave component that the master component wishes to access. In one example, the control signals include an indicator identifying the particular slave component. At 913, it is determined whether the slave side arbitrator is instructing the master component to wait. If the slave side arbitrator tells the master component to wait, the master component can wait and subsequently resend signals at 921. At 915, it is determined whether the slave component told the master component to wait. As noted above, the slave component may signal a master component to wait when a request from a master component uses a discernible amount of processing time. A master component at 923 can then wait for data from the slave component. Otherwise, the master component receives data from the slave component at 917.

Figure 10:
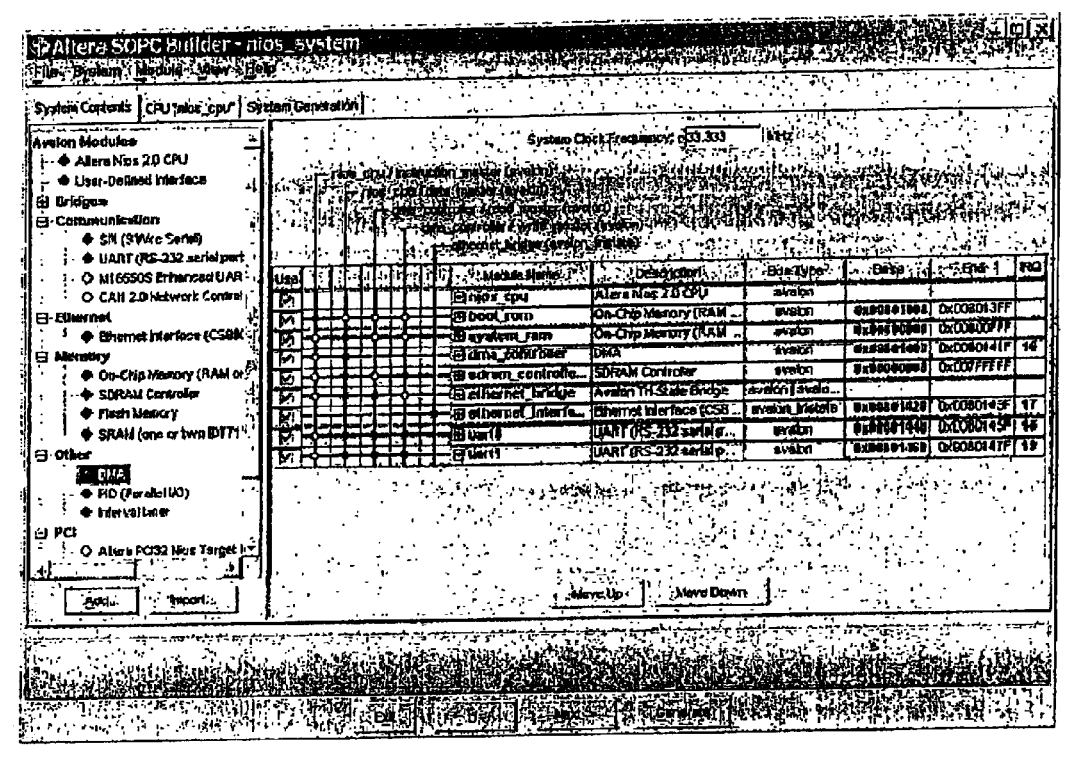

FIG. 10 is a diagrammatic representation showing one example of how a device with multiple master components can be configured on a programmable chip. It should be noted, however, that the techniques of the present invention can be used on devices other than programmable chips. In one example, the bus mastering techniques can be implemented on an ASIC or a server or client machine.

A system builder tool can be used to automatically configure a programmable chip to include master components such as processors, DMA components, Ethernet components and slave components such as memory, PIO, and UARTs. A system builder can use a graphical interface to allow the creation of a custom bus that provides for the implementation of an unlimited number of bus masters. The system builder allow selection of arbitration schemes, master and slave ports, clock speed, addresses, and interrupts. The system builder tool then generates a system using a hardware description language such as VHDL or Verilog.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of master and slave components and should not be restricted to the ones mentioned above. It is therefore intended that the invention be interpreted to include all variations and equivalents that fall within the true spirit and scope of the present invention.

What is claimed is:

1. A system having multiple master components and multiple slave components, the system comprising:
   a first master component;
   a second master component; and
   a first slave side arbitrator associated with a first slave component, the first slave side arbitrator coupling the first and second master components to the first slave component, wherein the first slave side arbitrator is operable to determine that the first master component has access to the first slave component and maintain the access after the slave component issues a split instruction.

2. The system of claim 1, further comprising:
   a second slave side arbitrator associated with a second slave component, the second slave side arbitrator coupling the first and second master components to the second slave component, wherein the second slave side arbitrator is operable to determine that a second master components has access to the second slave component.

3. The system of claim 2, wherein having access to the first slave component comprises being allowed to perform a read or write operation on the first slave component.

4. The system of claim 3, wherein having access to the second slave component comprises being allowed to perform a read or write operation on the second slave component.

5. The system of claim 2, wherein the first master is a processor core or an DMA component on a programmable chip.

6. The system of claim 2, wherein the first slave is a memory component, a UART component, or a PIO component on a programmable chip.

7. The system of claim 2, wherein the second slave side arbitrator comprises second arbitrator switching circuitry and arbitration logic.

8. The system of claim 7, wherein arbitration logic generates control signals that are provided to the second arbitrator switching circuitry.

9. The system of claim 8, wherein the second switching circuitry comprises a multiplexer for receiving write data.

10. The system of claim 1, wherein access by the first master component to the first slave component is maintained using a master locking indicator associated with the first slave side arbitrator.

11. The system of claim 1, wherein the first slave side arbitrator comprises first arbitrator switching circuitry and arbitration logic.

12. A programmable chip having an embedded processor core, the programmable chip comprising:
   a first master component;
   a second master component, wherein the second master component is a processor core;
   a slave side arbitrator coupling the first and second master components to a first slave component;
   a second slave component coupled to the second master;
   wherein the slave side arbitrator is associated with a master locking indicator providing the first master component access to the first slave component while the second master component has access to the second slave component.

13. The system of claim 12, wherein having access to the first slave component comprises being allowed to perform a read or write operation on the first slave component.

14. The system of claim 13, wherein having access to the second slave component comprises being allowed to perform a read or write operation on the second slave component.

15. The system of claim 14, wherein the first master is an DMA component.

16. The system of claim 12, wherein the first slave component is a memory component.

17. The system of claim 12, wherein the slave side arbitrator comprises arbitrator switching circuitry and arbitration logic.

18. The system of claim 17, wherein arbitration logic generates control signals that are provided to the arbitrator switching circuitry.

19. The system of claim 18, wherein the switching circuitry comprises a multiplexer for receiving write data.

20. The system of claim 19, wherein arbitration logic provides the multiplexer with control signals.

21. The system of claim 12, further comprising a decoder coupling the second master to the first and second slave components.

22. The system of claim 21, wherein the decoder comprises decoder switching circuitry and decoder logic.

23. The system of claim 22, wherein decoder logic generates control signals that are provided to the decoder switching circuitry.

24. The system of claim 23, wherein the decoder switching circuitry comprises a multiplexer for receiving read data.

25. A method for arbitration in a system having multiple master components, the method comprising:
   providing a first master with access to a first slave, wherein the first master and the first slave are components of a processing system;
   disregarding a split instruction associated with the first slave;
   providing a second master with access to a second slave while the first master is accessing the first slave, wherein the second master and the second slave share a single address space with the first master and the first slave in the processing system.

26. The method of claim 25, wherein providing access to the first slave comprises allowing read or write operations on the first slave.

27. The method of claim 26, wherein providing access to the second slave comprises allowing read or write operations on the second slave.

28. The method of claim 27, wherein the first master is an DMA component.

29. The method of claim 25, wherein the first slave component is a memory component.

30. The method of claim 25, wherein the second master component is also a slave component of the first master component.

31. An apparatus for multiple mastering, the apparatus comprising:
   means for providing a first master with access to a first slave, wherein the first master and the first slave are components of a processing system;
   means for ignoring a split instruction associated with the first slave;
   means for providing a second master with access to a second slave while the first master is accessing the first slave, wherein the second master and the second slave share a single address space with the first master and the first slave in the processing system.

32. The apparatus of claim 31, wherein means for providing access to the first slave comprises means for allowing read or write operations on the first slave.

33. The apparatus of claim 32, wherein means for providing access to the second slave comprises means for allowing read or write operations on the second slave.

34. The apparatus of claim 33, wherein the first master is an DMA component.

35. The apparatus of claim 31, wherein the first slave component is a memory component.

36. The apparatus of claim 31, wherein the second master component is also a slave component of the first master component.

* * * * *